United States Patent
Bagley et al.

(10) Patent No.: US 6,260,003 B1
(45) Date of Patent: Jul. 10, 2001

(54) STATISTICAL COMPENSATION OF LOAD POSITION ON A PLATFORM SCALE

(75) Inventors: William Charles Bagley; Lee Anthony Herrin, both of Webb City, MO (US)

(73) Assignee: Cardinal Scale Manufacturing Company, Webb City, MO (US)

( * ) Notice: Subject to any disclaimer, the term of this patent is extended or adjusted under 35 U.S.C. 154(b) by 0 days.

(21) Appl. No.: 09/209,986

(22) Filed: Dec. 11, 1998

(51) Int. Cl.[7] .................................................. G01G 7/00
(52) U.S. Cl. ..................... 702/179; 702/173; 702/174; 73/862.627; 177/25.14; 177/201
(58) Field of Search ..................... 702/179, 173, 702/174, 181–185; 177/25.11, 25.13, 25.14, 211, 203, 204, 201, 202; 73/862.627

(56) References Cited

U.S. PATENT DOCUMENTS

| 4,049,069 | 9/1977 | Tamamura et al. . |
|---|---|---|
| 4,261,195 | 4/1981 | Lockery . |
| 4,368,792 | 1/1983 | Ottle . |
| 4,401,173 | 8/1983 | Komoto . |
| 4,416,342 | 11/1983 | Snead . |
| 4,556,115 | 12/1985 | Lockery et al. . |
| 4,574,899 | 3/1986 | Griffin . |
| 4,738,324 | 4/1988 | Borchard . |
| 4,799,558 | * | 1/1989 | Griffen ................................ 177/25.14 |
| 4,804,052 | * | 2/1989 | Griffen ................................ 177/25.14 |
| 5,004,058 | * | 4/1991 | Langford et al. .................. 177/25.13 |

* cited by examiner

*Primary Examiner*—Kamini Shah
*Assistant Examiner*—Hien Vo
(74) *Attorney, Agent, or Firm*—Hovey, Williams, Timmons & Collins

(57) ABSTRACT

A platform scale (10) includes a signal processor (22) operable to perform statistical analyzes such as least squares or other mathematical analyzes such as successive approximation of the load signals from the respective load cells (14) supporting a platform (12) in order to produce load position correction factors used in determining the weight of a load on the scale (10).

9 Claims, 1 Drawing Sheet

STATISTICAL COMPENSATION OF LOAD POSITION ON A PLATFORM SCALE

RELATED APPLICATIONS

Not applicable.

FEDERALLY SPONSORED RESEARCH OR DEVELOPMENT

Not applicable.

MICROFICHE APPENDIX

Not applicable.

BACKGROUND OF THE INVENTION

1. Field of the Invention

The present invention relates to the field of multiple load cell vehicle scales. More particularly, the invention is concerned with using statistical analysis to derive load position correction factors for a scale having a plurality of load cells.

2. Description of the Prior Art

A typical platform scale includes a platform supported by a plurality of load cells that are coupled with a signal processor. The load cells produce load signals representative of the weight experienced by each load cell. The signal processor processes the load cell signals to produce weight signals representative of the total weight of a load on the platform. The weight signals are derived from a combination of the load signals from the load cells.

However, the weight signals are subject to error due to the position of the load on the platform. That is, the same load at different positions on the platform may produce different weight indications. This is known as load position error. Load position correction factors must be derived for use with each of the load signals in order to compensate for this error.

One prior art technique for load position compensation is to place a given load in turn over each load cell on the platform. At each position, load cell readings are taken. These readings are used in a set of simultaneous equations, one equation for each load cell and one unknown (the correction factor) for each load cell. Algebraic techniques are used to solve these equations for the correction factors. However, these techniques use only one set of readings for each load position over a given load cell and thereby, cannot compensate for cyclic or random errors.

SUMMARY OF THE INVENTION

The present invention solves the prior art problems discussed above and provides a distinct advance in the state of the art. In particular, the platform scale apparatus hereof derives load position correction factors using statistical techniques providing the ability to compensate for cyclic and random errors.

The preferred scale apparatus in accordance with the present invention includes a platform supported by a plurality of load cells coupled with a signal processor which is operable to receive load signals from the load cells and to produce weight signals derived from a combination of load signals representative of the weight of a load on a scale. The processor is operable to perform a statistical analysis of the load signals corresponding to a plurality of different positions of a given load on the platform to derive therefrom respective load position correction factors. These factors are used to compensate for load position error in deriving subsequent weight signals.

In preferred forms, the correction factors are derived from load signals corresponding to a load placed on the platform over each of the load cells a plurality of times. This compensates for cyclic and random errors. The preferred statistical analysis includes least squares analysis or successive approximation analysis. Other preferred aspects of the preferred embodiment are disclosed herein.

DETAILED DESCRIPTION OF THE PREFERRED EMBODIMENT

Figure 1:
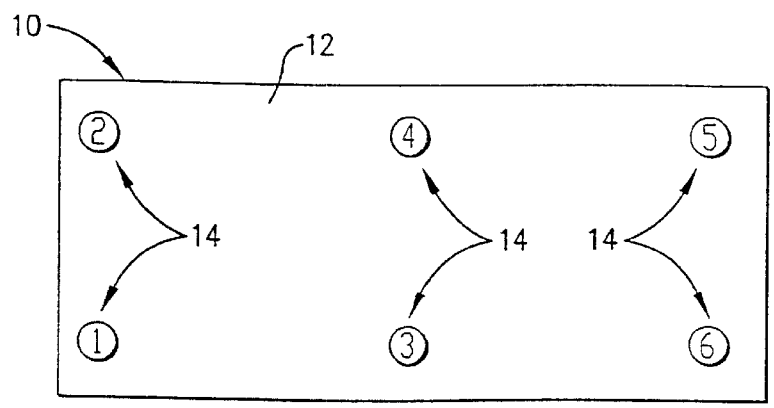
FIG. 1 is a schematic representation and plan view of the preferred scale apparatus in accordance with the present invention.
Figure 2:
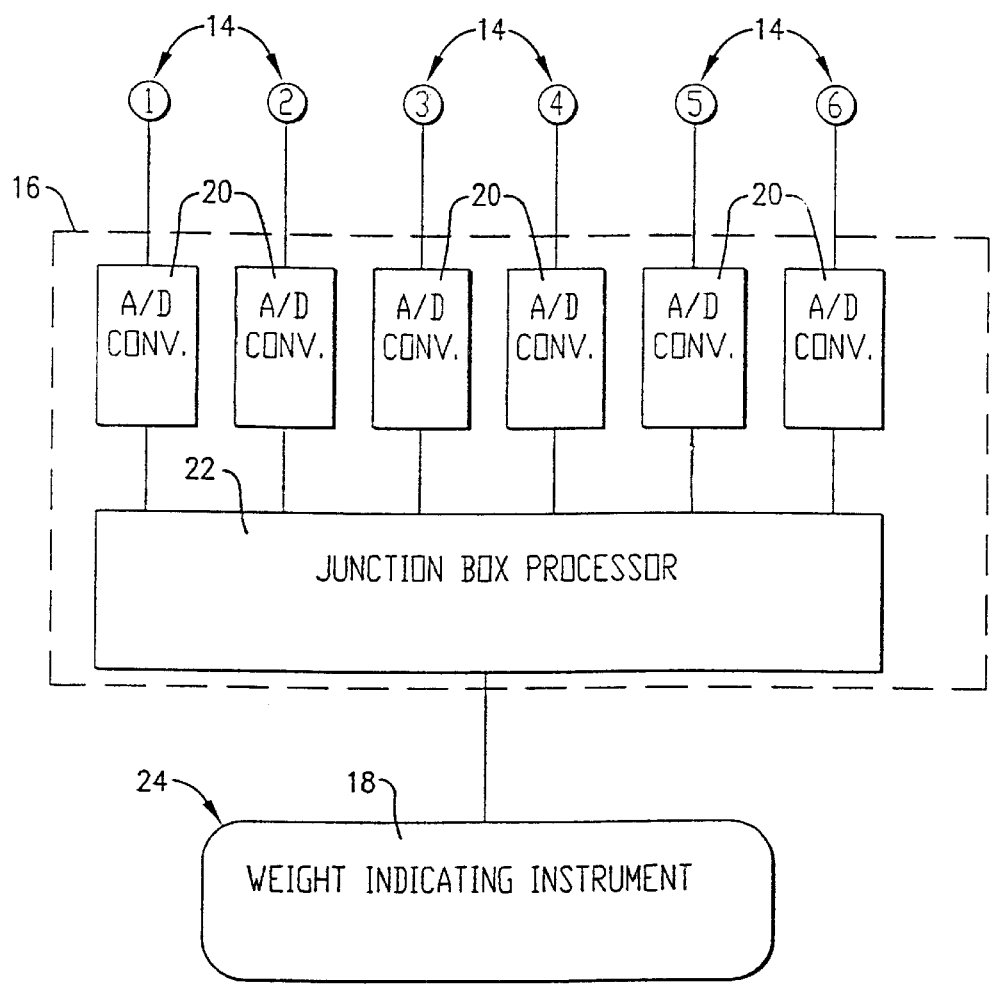
FIG. 2 is an electrical block diagram of the apparatus of FIG. 1.

The drawing figures illustrate preferred scale apparatus 10 in accordance with the present invention. Apparatus 10 includes platform 12, six load cells 14, signal processor 16 and display screen 18. Load cells 14 are individually numbered 1 through 6 as shown in FIG. 1 in their supporting positions relative to platform 12.

Signal processor 16 includes six analog-to-digital (A/D) converters 20 and processor 22. Converters 20 are coupled with respective load cells 14 and convert the respective analog load signals received therefrom to digital load signals provided to processor 22.

In the preferred embodiment, processor 22 is a microprocessor based unit which could be a conventional personal computer or custom designed circuit configured to fit within a junction box. Processor 22 is under program control to perform the operations and functions disclosed herein. Display screen 18 is included as part of weight indicating instrument 24 which can also include a keyboard, printer and other components for operating apparatus 10.

In the general operation of apparatus 10, signal processor 16 receives the load signals from load cells 14 and responds by producing weight signals derived from a combination of the load signals and representative of the weight of a load on the platform 12. The weight signals are provided to screen 18 which responds by producing a visual display representative of the weight.

Those skilled in the art understand, however, that a mere summation of the individual weight-indicating signals from load cells 14 may not present an accurate indication of the weight of the load on platform 12. For an accurate weight indication, correction factors must be used in order to correct for a variety of effects. These include zero, span, temperature, nonlinearity and load position.

In the preferred embodiment of the present invention, the correction factors for load position are derived using statistical analyses including least squares or other mathematical techniques such as successive approximation. For the least squares method, a given load is positioned on platform 12 over each load cell 14 in turn. In each position over a load cell, signal processor 16 receives and stores a set of readings, that is, one value for each load cell. For a scale with six load cells, there would be six sets of values, one set for each load cell, and each set includes six values, one value for each load cell. Each set corresponds to a different position of the test load on the platform and preferably with the test load position as close as practical over a given load cell for the corresponding set of values.

For simplicity, the table below illustrates sets of values for three load cells. For illustration, cell number 1 has a cyclic component in the form of a sinusoidal wave with a peak amplitude of 0.28 units and the test load is equal to about 50% of cell capacity. For this example:

| Cell number | Output (mv/v) |
|---|---|
| 1 | 1.95 |
| 2 | 2.1 |
| 3 | 2.05 |

| Load Position | Cell 1 | Cell 2 | Cell 3 | Total Output |
|---|---|---|---|---|
| 1 | 0.34125 | 0.49350 | 0.18450 | 1.01925 |
| 2 | 0.20475 | 0.66150 | 0.16400 | 1.03025 |
| 3 | 0.83850 | 0.19950 | 0.09225 | 1.13025 |
| 4 | 0.10725 | 0.24150 | 0.64575 | 0.99450 |
| 3 | 0.77025 | 0.19950 | 0.09225 | 1.06200 |
| 3 | 0.70200 | 0.19950 | 0.09225 | 0.99375 |
| 3 | 0.63375 | 0.19950 | 0.09225 | 0.92550 |
| 3 | 0.56550 | 0.19950 | 0.09225 | 0.85725 |
| 3 | 0.63375 | 0.19950 | 0.09225 | 0.92550 |
| 3 | 0.70200 | 0.19950 | 0.09225 | 0.99375 |
| 3 | 0.77025 | 0.19950 | 0.09225 | 1.06200 |
| 3 | 0.70200 | 0.19950 | 0.09225 | 0.99375 |

In the prior art techniques for load position correction, only three sets of values are used which leads to an error in the load position correction factors because the cyclic error cannot be taken into account with only one set of readings. In the least squares of the present invention all 12 data sets are used.

For example, let $X_1$ equal the output from cell number 1, $X_2$ equal the output from cell number 2, $X_3$ equal the output from cell number 3 and Y equal the average of the outputs. The following values are calculated:

$$\sum X_1^5 \quad \sum X_2^2 \quad \sum X_3^2 \quad \sum X_1 X_2 \quad \sum X_1 X_3 \quad \sum X_2 X_3$$
$$\sum X_1 Y \quad \sum X_2 Y \quad \sum X_3 Y$$

These values are placed in the matrix shown below:

$$\begin{vmatrix} \sum X_1^2 & \sum X_1 X_2 & \sum X_1 X_3 \\ \sum X_2 X_1 & \sum X_2^2 & \sum X_2 X_3 \\ \sum X_3 X_1 & \sum X_3 X_2 & \sum X_3^2 \end{vmatrix} \cdot \begin{vmatrix} A_1 \\ A_2 \\ A_3 \end{vmatrix} = \begin{vmatrix} \sum X_1 Y \\ \sum X_2 Y \\ \sum X_3 Y \end{vmatrix}$$

Using the Gauss-Jordan elimination procedure, the following values are obtained for the correction coefficients $A_1 = 0.997349$ $A_2 = 0.973134$ $A_3 = 1.025878$ Using this set of correction coefficients, all 12 of the data set equations are solved for the total weight. The total varies from a minimum of 0.852778 to a maximum of 1.125055 and has an average of 0.994518 and a standard deviation of 0.068. This standard deviation is less than half of that obtained from the data using the coefficients developed from use of simultaneous equations. It can therefore be concluded that the least squares method of calculating the correction coefficients is affected less by random and cyclic errors in the output of a load cell than are the coefficients determined by use of simultaneous equations.

Another embodiment of the present invention uses the successive approximation method. For example, the total load from a multiple load cell scale can be expressed as $$A_1 X_1 + A_2 X_2 + A_3 X_3 + A_4 X_4 + \ldots A_N X_N = Y$$

Where:
$A_N$ = Correction Coefficient for Load Cell N
$X_N$ = Output from Load Cell N
Y = Combined Load Cell Output From Scale (Total Load)

The intent is to determine the values of A such that Y remains constant regardless of where the load is placed on the platform (regardless of the apportionment of load among the load cells).

The first step is to place a load directly over the first load cell and record the output from each load cell along with the total output. The process is repeated for each of the remaining load cells. (This would be done automatically by pressing a key on the weight indicator telling it to store the data from all the load cells for the current load position.) For example, a scale with four load cells with the outputs shown is subjected to four loadings, each with the load placed directly over one of the four cells.

| Cell Number | Output (mV/V) |
|---|---|
| 1 | 2.05 |
| 2 | 1.95 |
| 3 | 1.90 |
| 4 | 2.15 |

Assuming the load used is equal to 50 percent of the load cell capacity and that the load cells see the entire load (a basic assumption for any scale) the following data is collected for four different load positions:

| Load Position | Cell 1 | Cell 2 | Cell 3 | Cell 4 | Total |
|---|---|---|---|---|---|
| 1 | 0.63550 | 0.20475 | 0.09500 | 0.07525 | 1.01050 |
| 2 | 0.24600 | 0.59475 | 0.04750 | 0.10750 | 0.99575 |
| 3 | 0.09225 | 0.05850 | 0.59850 | 0.23460 | 0.98385 |
| 4 | 0.06150 | 0.12675 | 0.19000 | 0.65575 | 1.03400 |

Note that the data indicates a concentration of the load over one of the four cells. The successive approximation is begun with the assumption that the correction coefficient for cell 1 ($A_1$) is equal to 1. For the first round of equations, the other correction coefficients are assumed to have initial values of 1 but the coefficient for cell number 1 remains 1 throughout the entire process.

The first step is to calculate the correction coefficient for cell 2 ($A_2$) using the data set where the load is concentrated over cell 2. Note that in each of the subsequent calculations of corrections coefficients, the outputs are all equal to the total output when the load is concentrated over cell 1.

$$0.24600 + A_2(0.59475) + (1)(0.04750) + (1)(0.10750) = 1.01050$$

$A_2 = 1.024800$

For cell 3:

$$0.09225 + (1.024800)(0.05850) + A_3(0.59850) + (1)(0.23460) = 1.01050$$

$A_3=1.042104$

For cell 4:

$$0.0615+(1.0248)(0.12675)+(1.042104)(0.190)+A_4(0.65575)=1.0105$$

$A_4=0.947170$

Using the correction coefficients calculated in the first round of the successive approximation with the data collected yields the following results:

$$(1)(0.63550)+(1.024800)(0.20475)+(1.042104)(0.09500)+(0.947170)(0.07525)=1.015602$$

$$(1)(0.24600)+(1.024800)(0.59475)+(1.042104)(0.04750)+(0.947170)(0.10750)=1.006821$$

$$(1)(0.09255)+(1.024800)(0.05850)+(1.042104)(0.59850)+(0.947170)(0.23460)=0.998106$$

$$(1)(0.06150)+(1.024800)(0.12675)+(1.042104)(0.19000)+(0.947170)(0.65575)=1.010500$$

Note that the difference in the calculated total compensated weight is much less than the uncompensated values. The process is repeated using the newly calculated compensation coefficients rather than values of 1 and using the total compensated weight when the load was over cell 1 as the total value. Using these values, refined values for the coefficients $A_2$, $A_3$ and $A_4$ are calculated.

$$(1)(0.24600)+(A_2)(0.59475)+(1.042104)(0.04750)+(0.947170)(0.10750)=1.015602$$

$A_2=1.03956$ $$(1)(0.09225)+(1.039565)(0.05850)+(A_3)(0.59850)+(0.947170)(0.23460)=1.015602$$

$A_3=1.069894$ $$(1)(0.06150)+(1.039565)(0.12675)+(1.069894)(0.19000)+A_4(0.65575)=1.015602$$

$A_4=0.944045$

This new set of coefficients can be substituted into the original equations to see how close the outputs match:

$$(1)(0.63550)+(1.039565)(0.20475)+(1.069894)(0.09500)+(0.944045)(0.07525)=1.021030$$

$$(1)(0.24600)+(1.039565)(0.59475)+(1.069894)(0.04750)+(0.944045)(0.10750)=1.016586$$

$$(1)(0.09225)+(1.039565)(0.05850)+(1.069894)(0.59850)+(0.944045)(0.23460)=1.014869$$

$$(1)(0.06150)=(1.039565)(0.12675)+(1.069894)(0.19000)+(0.944045)(0.65575)=1.015602$$

Note that the difference in total weights is less after the second iteration. This procedure is repeated until the difference in total weights is equal to or less than the required level. (After fifteen computations the difference was less than one part per million.)

Once the process is complete, the correction coefficients are stored and used each time a weight sample is prepared for display. If one of the load cells is replaced it will be necessary to repeat the entire procedure to arrive at a new set of coefficients.

Those skilled in the art will appreciate that the present invention encompasses many variations in the preferred embodiments described herein. For example, there are a wide variety of statistical techniques that are available or may be developed that could be used in place of the preferred least squares and successive approximation techniques disclosed herein. Having thus disclosed these embodiments, the following is claimed as new and desired to be secured by Letters Patent:

What is claimed is:

1. A scale apparatus comprising:

a platform;

a plurality of load cells supporting said platform, said load cells being operable to produce respective load signals representative of the weight experienced by said respective load cells of a load on said platform;

a signal processor coupled with said load cells and operable to receive said load signals and responsive thereto to produce weight signals derived from a combination of said load signals and representative of the weight of a load on said platform; and a display screen coupled with said signal processor and operable to receive said weight signals and responsive thereto to produce a visual display representative of the weight of a load on said platform, said combination of said load signals being subject to load position error, said signal processor being operable to perform a statistical analysis of said load signals corresponding to a plurality of different positions of a given load on said platform to derive therefrom respective load position correction factors for said load signals and to compensate for said load position error by using said correction factors in deriving subsequent weight signals.

2. The apparatus of claim 1, said signal processor including a computer under program control.

3. The apparatus of claim 1, said plurality of different positions including the placing of a given load on said platform generally over each of said load cells.

4. The apparatus of claim 3, said plurality of different positions including placing of said given load on said platform generally over each of said load cells a plurality of times to compensate for cyclic and random errors in said load samples.

5. The apparatus of claim 1, said statistical analysis including one of least squares analysis and successive approximation analysis.

6. A method of compensating for load position error on a scale apparatus having a platform supported by a plurality of load cells operable to produce respective load signals experienced by said respective load cells representative of the weight of a load on the platform, said method comprising:

(a) receiving said load signals into a signal processor and therein deriving from a combination of said load signals weight signals representative of the weight of a load on the platform; and (b) producing a visual display from said weight signals representative of the weight of a load on the platform, said combination of said load signals being subject to load position error, step (a) including placing a load in different positions on said platform and in said signal processor performing a statistical analysis of said load signals corresponding to said different positions to derive therefrom respective load position correction factors.

7. The method of claim 6, step (a) including the step of performing one of successive approximation and least squares analysis of said load signals.

8. The method of claim 6, step (a) including the step of receiving said load signals into a computer under program control as said signal processor.

9. The method of claim 6, step (a) including the step of positioning a given load generally over each of the load cells a plurality of times as said plurality of different positions.

* * * * *